US012807417B2

(12) United States Patent
Nannetti

(10) Patent No.: US 12,807,417 B2
(45) Date of Patent: Nov. 24, 2026

(54) TRANSPORT SYSTEM OF PRODUCTS BY MEANS OF A CLOSED LOOP COGGED BELT WITH A VERTICAL ACTIVATION AXIS

(71) Applicant: MARCHESINI GROUP S.P.A., Pianoro (IT)

(72) Inventor: Simone Nannetti, Grizzana Morandi (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 63 days.

(21) Appl. No.: 18/867,449

(22) PCT Filed: May 23, 2023

(86) PCT No.: PCT/IB2023/055276
§ 371 (c)(1),
(2) Date: Nov. 20, 2024

(87) PCT Pub. No.: WO2023/228067
PCT Pub. Date: Nov. 30, 2023

(65) Prior Publication Data

US 2025/0346432 A1 Nov. 13, 2025

(30) Foreign Application Priority Data

May 25, 2022 (IT) ........................ 102022000010853

(51) Int. Cl.
*B65G 17/22* (2006.01)
*B65G 17/12* (2006.01)
(Continued)

(52) U.S. Cl.
CPC ............. *B65G 17/22* (2013.01); *B65G 17/12* (2013.01); *B65G 17/32* (2013.01); *B65G 21/20* (2013.01); *B65G 21/22* (2013.01)

(58) Field of Classification Search
CPC ........ B65G 17/22; B65G 17/12; B65G 17/32; B65G 21/20; B65G 21/22
See application file for complete search history.

(56) References Cited

U.S. PATENT DOCUMENTS 6,405,852 B1 6/2002 Christ
6,460,691 B1 * 10/2002 Gaensewig ............. B65B 43/52 198/844.1

(Continued)

FOREIGN PATENT DOCUMENTS

DE 102006062530 7/2008
DE 202012009051 1/2014
DE 202020104720 U1 * 8/2020 ............. B65G 21/22

OTHER PUBLICATIONS

DE-102023002558 and translation (Year: 2024).*

(Continued)

*Primary Examiner* — Mark A Deuble
(74) *Attorney, Agent, or Firm* — JCIPRNET

(57) ABSTRACT

A transport system of products according to a closed looped transport path, comprising: a cogged belt wound in a closed loop; a series of support elements of the products, coupled in a cantilever fashion to the cogged belt; a series of fixing elements, configured so as to be arranged internally of the cogged belt for fixing the support elements in a cantilever fashion to the cogged belt, and a guide system for the fixing elements.

9 Claims, 5 Drawing Sheets

(51) Int. Cl.

| | |
|---|---|
| ***B65G 17/32*** | (2006.01) |
| ***B65G 21/20*** | (2006.01) |
| ***B65G 21/22*** | (2006.01) |

(56) References Cited

U.S. PATENT DOCUMENTS

| | | | | |
|---|---|---|---|---|
| 10,144,541 | B2 * | 12/2018 | Rea | B65B 35/18 |
| 10,239,697 | B2 * | 3/2019 | Lakhotia | B65G 23/16 |
| 10,562,654 | B2 | 2/2020 | Castellari | |
| 2008/0271976 | A1 | 11/2008 | Monti | |
| 2017/0050804 | A1 * | 2/2017 | Kitamura | B23Q 3/15724 |
| 2019/0337732 | A1 * | 11/2019 | Yoder | B65G 17/323 |
| 2025/0282554 | A1 * | 9/2025 | Nannetti | B65G 17/44 |

OTHER PUBLICATIONS

"International Search Report (Form PCT/ISA/210) of PCT/IB2023/055276", mailed on Aug. 30, 2023, pp. 1-3.

"International Search Report (Form PCT/ISA/210) of PCT/IB2023/055276", mailed on May 23, 2023, pp. 1-3.

* cited by examiner

TRANSPORT SYSTEM OF PRODUCTS BY MEANS OF A CLOSED LOOP COGGED BELT WITH A VERTICAL ACTIVATION AXIS

CROSS-REFERENCE TO RELATED APPLICATION

This application is a 371 application of the International PCT application serial no. PCT/IB2023/055276, filed on May 23, 2023, which claims the priority benefits of Italy Patent Application No. 102022000010853, filed on May 25, 2022. Each of the entirety of the above-mentioned patent applications is hereby incorporated by reference herein and made a part of this specification.

DESCRIPTION OF THE INVENTION

Field of the Invention

The present invention relates to the special technical sector concerning transport systems of products which use a closed loop conveyor means, such as for example a cogged belt wound in a closed loop on relative driving pulleys having a vertical axis.

The transport systems are utilised to carry out the transport of products while substantially maintaining the products constantly at a same height from the ground surface, and in a looped pathway along which various work stations are positioned, which stations are delegated to carrying out special operations or processes on the products.

For example, this particular type of transport systems is especially used in the transport of the tubes that are open at a relative end, which must be maintained in a vertical position, with the open end facing upwards, always positioned at a same height, and which must always be transported at successive work stations designed to carry out filling, closure and possibly marking thereof, and so on.

Description of the Prior Art

The known transport systems of this type therefore comprise a cogged belt wound in a closed loop on relative driving pulleys arranged with the relative axis vertical, and a series of support elements for the products that are coupled, and constrained, in a cantilever fashion to the cogged belt.

The support elements are conformed in such a way as to comprise a housing, or a suitable seat, for receiving and supporting the products that are to be transported to successive work stations by the activation, either in continuous mode or step mode (alternated mode), of the belt.

The support elements are coupled to the cogged belt at through-holes, realised on the cogged belt, and are constrained to the cogged belt by respective fixing elements which are arranged at the through-holes on the inner side of the cogged belt, i.e. the side having the cogging for enmeshing with the driving pulleys.

During the activation of the cogged belt, the support elements, owing to the weight of the products borne thereby and the speeds at which the cogged belt can be activated, are subject to flexion stresses which can compromise the stability of the products, as well as influencing the effective orientation thereof.

For example in the case of products constituted by tubes, they might not be maintained in a correct vertical configuration, and this is a circumstance that might compromise the filling and closure operations.

At present, in order to obviate these drawbacks, in the known transport systems, sliding block elements, also known as shuttles, are associated to the fixing elements of the support elements, and respective straight guides are associated to the cogged belt at the relative straight portions, which guides can accommodate the sliding block elements slidably therein.

In this way, when the support elements are moved along the two straight portions of the cogged belt, at which the work stations are usually located, the support elements are to some extent maintained stable in the cantilever positions thereof with respect to the cogged belt, as the sliding block elements slide internally of the straight sliding guides.

This type of transport system however has a number of drawbacks.

In fact, issues can emerge relating to correct insertion of the sliding block elements internally of the straight guides at the passage of the sliding block elements from a curved portion of the belt to a straight portion of the belt, as well as, vice versa, from a curved portion to a straight portion.

This can cause the onset of impacts and stresses on the sliding block elements which have repercussions on the fixing elements and therefore on the stability of the coupling of the support elements to the cogged belt, or can even lead to sticking which might place the continuity of activation of the cogged belt in jeopardy.

Thus the fixing elements might break, or there might be a loosening of the coupling of the support elements to the cogged belt.

Further, any eventual impacts might generate an unpleasant noise level.

SUMMARY OF THE INVENTION

The aim of the present invention is therefore to describe a new transport system for transport of products by means of a cogged belt that is closed loop wound with a vertical activation axis and that is able to obviate the above-cited drawbacks present in prior art.

In particular, the aim of the present invention is to describe a novel transport system which enables conserving the fixing to and stability of the support elements of the products on the belt, thus guaranteeing the orientation thereof both in the straight portions and the curved portions of the cogged belt.

The above-mentioned advantages are obtained according to the contents of the claims.

BRIEF DESCRIPTION OF THE DRAWINGS

The characteristics of a preferred but not exclusive embodiment of the transport system of the present invention will be set out in the following description made with reference to the appended tables of drawings, in which.

DESCRIPTION OF PREFERRED EMBODIMENTS

With reference to the accompanying tables of drawings, numerical reference (100) denotes the transport system of products in a closed looped transport path that is the object of the present invention, in its entirety.

The transport system (100) comprises a cogged belt (D) wound in a closed loop on driving pulleys (P) which are arranged with a vertical rotation axis (Z), and a series of support elements (S), configured to support respective products, which are coupled in a cantilever fashion to the cogged belt (D).

The support elements (S) can for example be configured in such a way as to comprise a positioning seat for the vertical positioning of tubes that are to be filled and then closed, or can be made in a different way according to the type of products that are to be transported.

The support elements (S) are coupled in a cantilever fashion to the cogged belt (D) at the position of the through-holes (F) made in the cogged belt (D) and the transport system (100) further comprises a series of fixing elements (1) which are configured to be arranged internally with respect to the cogged belt (D) at the through-holes (F), for the fixing of the support elements (S) in a cantilever fashion to the cogged belt (D).

The transport system (100) further comprises a guide system (10) for guiding the fixing elements (1) during the activation of the cogged belt (D) with the aim of maintaining the support elements (S) stable in the cantilevered position thereof on the cogged belt (D), and thus stably maintaining the products supported thereby during the transport thereof.

The peculiarities of the transport system (100) of the invention consist in the ways in which the guide system (10) of the fixing elements (1) are realised and configured.

Figure 8:
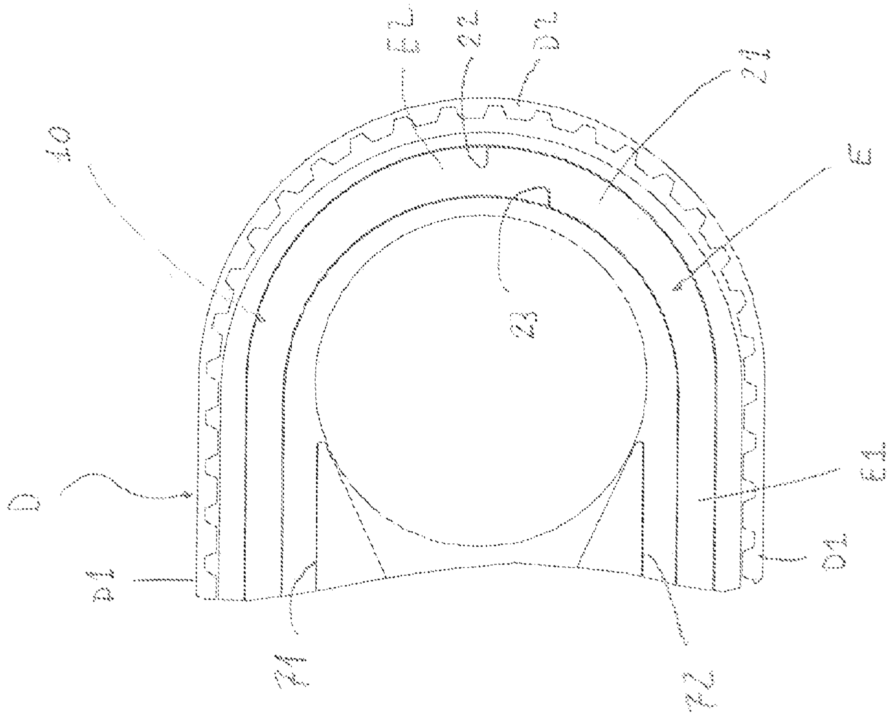
FIG. 8 illustrates, again in a partial view from above, the portion of the transport system of FIG. 7, with some components removed so as to evidence other components of the transport system.

The guide system (10) comprises (see for example FIGS. 3, 8, and 9):

- a first continuous upper guide channel (11), which is conformed in such a way as to present a respective first outer edge (12) and a respective first inner edge (13) and which extends according to a closed loop path (C) internally of the closed loop of the cogged belt (D) and comprises straight portions (C1) arranged at straight branches (D1) of the cogged belt (D), and curved portions (C2), connected to the straight portions (C1), at the curvilinear branches (D2) of the cogged belt (D),
- and a second continuous lower guide channel (21), conformed in such a way as to present a respective second outer edge (22) and a respective second inner edge (23) and which extends according to a closed loop path (E) internally of the closed loop of the cogged belt (D) and comprises straight portions (E1), arranged at the straight branches (D1) of the cogged belt (D), and curved portions (E2), connected to the straight portions (E1) at the curvilinear branches (D2) of the cogged belt (D). Further, the guide system (10) also comprises, for each fixing element (1) (visible in detail for example in FIGS. 3, 4, 5 and 6), at least a first sliding element (31, 32), and at least a second sliding element (41, 42).

Figure 9:
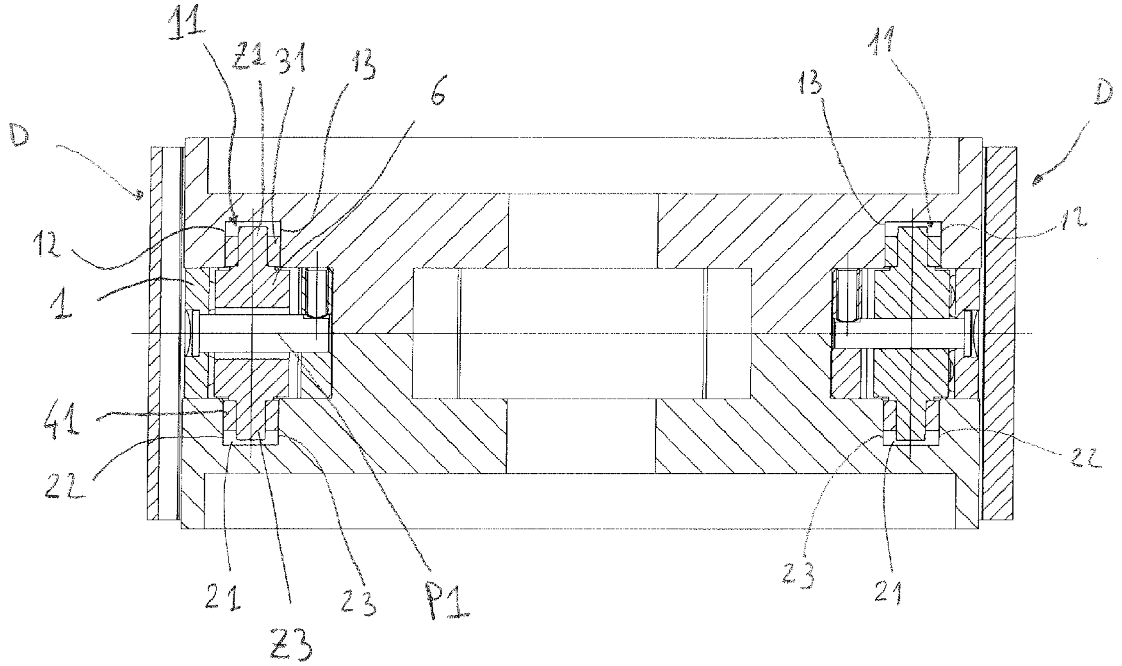
FIG. 9 is a view according to a section plane that is vertical and transversal to the transport system.

The at least a first sliding element (31, 32) is arranged superiorly of the fixing element (1) and is configured to be able to slide internally of the first continuous upper guide channel (11), between the first outer edge (12) and the first inner edge (13) (see for example FIG. 9).

Regarding this, the at least a first sliding element (31, 32) is conformed in such a way as to comprise a respective first contact wall (310, 320), for the contact with the first outer edge (12) of the first continuous upper guide channel (11), and a respective second contact wall (311, 321), for the contact with the first inner edge (13) of the first continuous upper guide channel (11).

Further, the at least a first sliding element (31, 32) is superiorly coupled to the fixing element (1) in such a way:

- as to be able both to rotate with respect to the fixing element (1) according to a vertical axis, parallel to the vertical rotation axis (Z) of the driving pulleys (P) of the cogged belt (D),
- and to be able to translate axially with respect to the fixing element (1) along a translation direction (DT) perpendicular to the vertical axis.

Figure 7:
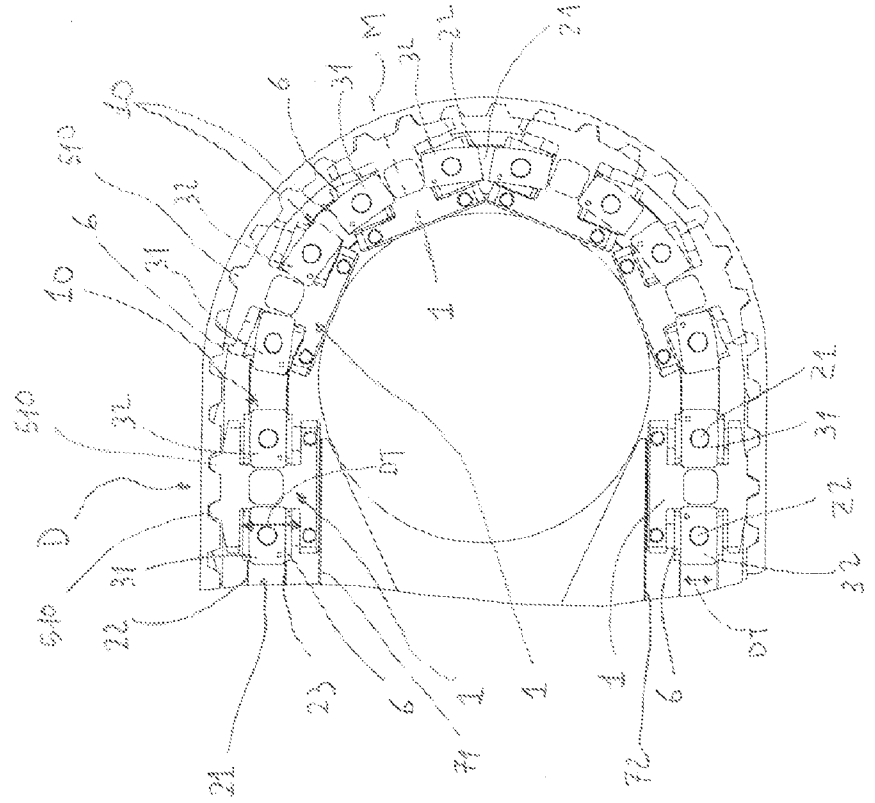
FIG. 7 is a partial view from above of a portion of the transport system of the invention.

In this way, during the activation of the cogged belt (D), the at least a first sliding element (31, 32) can change the orientation and position thereof with respect to the fixing element (1) as a consequence of the passage thereof from a straight portion (C1) to a curved portion (C2), and vice versa, of the first continuous upper guide channel (11) and thus adapt the orientation thereof within the first continuous upper guide channel (11) in such a way that at least one from between the respective first contact wall (310, 320) and the respective second contact wall (311, 321) is always in contact respectively with the first outer edge (12) or the first inner edge (13) of the first continuous upper guide channel (11) (see for example FIG. 7 and FIG. 9).

In turn, the at least a second sliding element (41, 42) is arranged inferiorly with respect to the fixing element (1) and is configured to be able to slide internally of the second continuous lower guide channel (21), between the second outer edge (22) and the second inner edge (23) (see for example FIG. 9).

For this purpose, the at least a second sliding element (41, 42) is conformed in such a way as to comprise a respective first contact wall (410, 420), for the contact with the second outer edge (22) of the second continuous lower guide channel (21), and a respective second contact wall (411, 421), for the contact with the second inner edge (23) of the second continuous lower guide channel (21).

Further, as for the at least a first sliding element (31, 32), the at least a second sliding element (41, 42) is inferiorly coupled to the fixing element (1) in such a way: as to be able both to rotate with respect to the fixing element (1) according to a vertical axis, parallel to the vertical rotation axis (Z) of the driving pulleys (P) of the cogged belt (D),

- and in such a way as to be able to translate axially with respect to the fixing element (1) along a translation direction (DT) perpendicular to the vertical axis, so that, during the activation of the cogged belt (D), the at least a second sliding element (41, 42) can change the orientation and position thereof with respect to the fixing element (1) as a consequence of the passage thereof from a straight portion (E1) to a curved portion (E2), and vice versa, of the second continuous lower guide channel (21) and thus adapt the orientation thereof within the second continuous lower guide channel (21) in such a way that at least one from between the respective first contact wall (410, 420) and the respective second contact wall (411, 421) is always in contact respectively with the second outer edge (22) or the second inner edge (23) of the second continuous lower guide channel (21).

Therefore, owing to the presence of the two continuous guide channels, and to the fact that both the at least a first sliding element and the at least a second sliding element can slide internally, respectively, of the first continuous guide channel and the second continuous lower guide channel, and can, with respect to the respective fixing element, both rotate about a vertical axis parallel to the rotation axis of the driving pulleys (P) of the cogged belt, and translate along a translation direction that is perpendicular to the vertical axis of rotation thereof, and can change the orientation thereof and the position thereof internally of the guide channels, while constantly maintaining the contact with the edges of the guide channels, at least with one respective wall thereof.

This enables maintaining the fixing element stable, during the movement imparted by the activation of the cogged belt, and then, consequently, maintaining in stability the position and cantilevered orientation of the support element fixed to the cogged belt by the fixing element, and therefore the product supported thereby.

Further, as a continuity of contact is always guaranteed between at least one of the walls of the at least a first sliding element and at least one of the walls of the at least a second sliding element with at least one of the two edges of the two continuous guide channels, especially in the passage points from the straight portions to the curved portions thereof, and vice versa, the activation of the cogged belt will be fluid and continuous, without noise or risk of sticking, and further activatable even at high velocities.

Further advantageous characteristics of the transport system of the present invention are described in the following.

Figure 1:
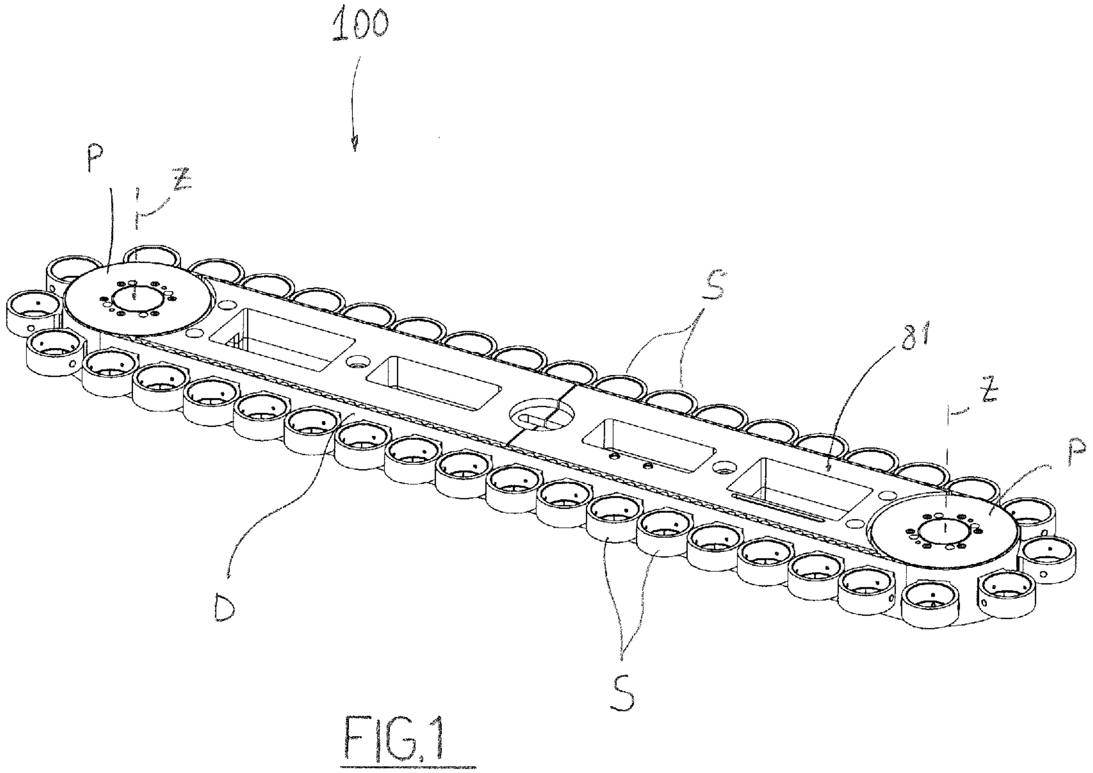
FIG. 1 is a schematic perspective view of the transport system of the present invention, in its entirety.
Figure 2:
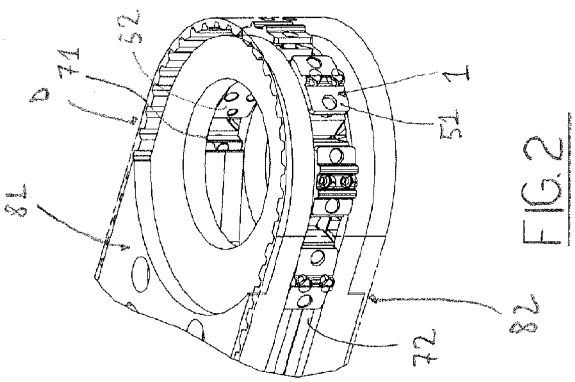
FIG. 2 is a partial schematic perspective view of a portion of the transport system of the invention, with some parts removed.
Figure 3:
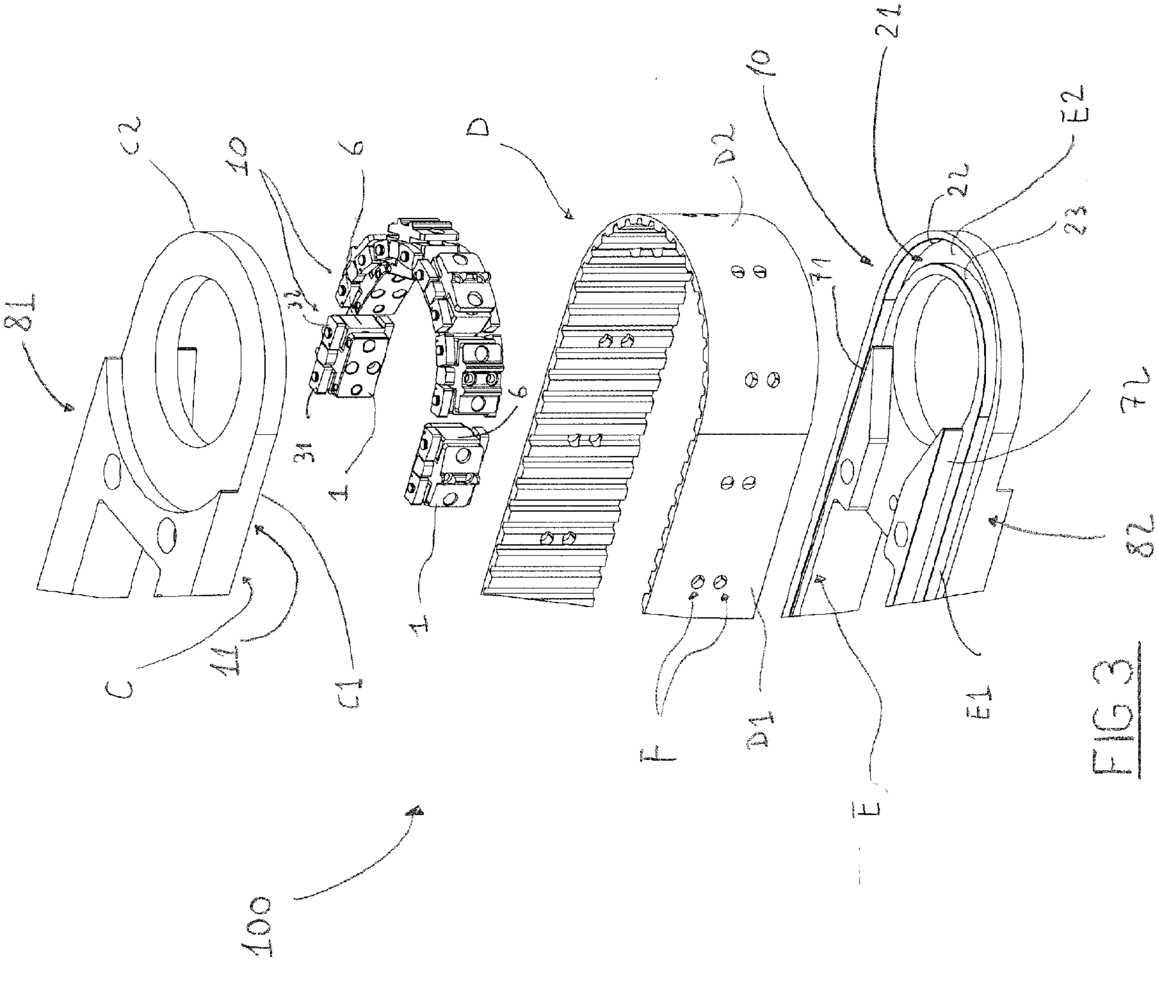
FIG. 3 is a partial exploded and perspective view of the significant components that make up the transport system of the invention.
Figure 5:
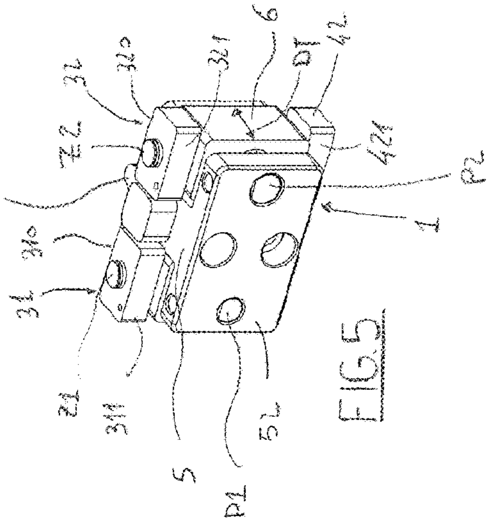
FIG. 5 is a perspective view of the components of FIG. 4, coupled and assembled to one another.
Figure 6:
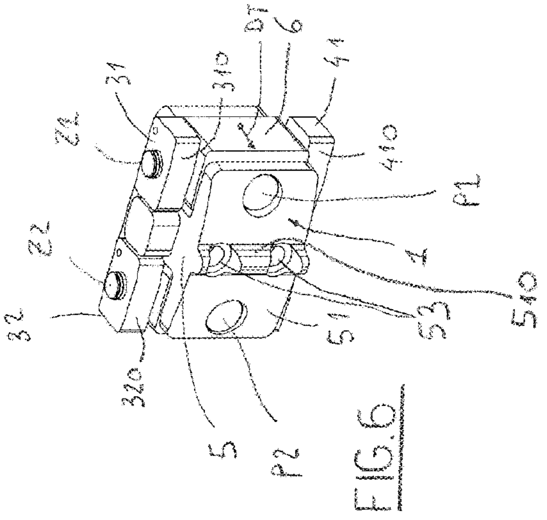
FIG. 6 is a perspective view taken from another angle of the components of FIG. 5, assembled to one another.
Figure 4:
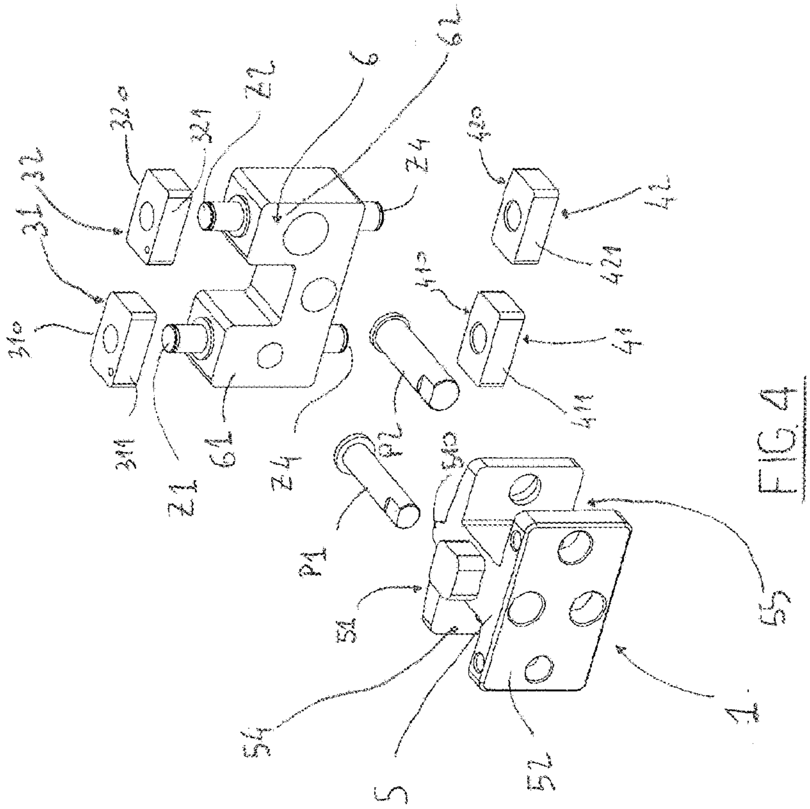
FIG. 4 is an exploded and perspective view of some significant components of the transport system of the invention.

On the basis of the preferred embodiment, illustrated in the figures, for example in FIGS. 4, 5 and 6, each fixing element (1) comprises a main body (5) which is conformed in such a way as to comprise a first front wall (51) and a second rear wall (52), wherein the first front wall (51) comprises respective fixing holes (53) and is conformed in such a way as to be internally coupled to the cogging of the cogged belt (D) in such a way that the respective fixing holes (53) are positioned at the through-holes (F) present in the cogged belt (D) for fixing the support elements (S) to the cogged belt (D) by means of respective blocking members (see FIGS. 3 and 7).

Further, the main body (5) of each fixing element (1) is conformed in such a way as to comprise, between the first front wall (51) and the second rear wall (52), a positioning housing (54, 55).

In this regard, the guide system (10) comprises, for each fixing element (1), a bearing element (6) for the at least a first sliding element (31, 32) and for the at least a second sliding element (41, 42) which is conformed in such a way as to be inserted and coupled translatably within the positioning housing (54, 55) of the fixing element (1) in order to be able to translate axially between the first front wall (51) and the second front wall (52) of the fixing element (1) according to the translation direction (DT) (FIGS. 4, 5 and 6).

Further, the at least a first sliding element (31, 32) is superiorly mounted to the bearing element (6) rotatably about a respective vertical pin (Z1, Z2) parallel to the vertical rotation axis (Z) of the pulleys (P) and the at least a second sliding element (41, 42) is mounted inferiorly to the bearing element (6) rotatably about a respective vertical pin (Z3, Z4) parallel to the vertical rotation axis (Z) of the pulleys (P).

According to the preferred but not exclusive embodiment illustrated in the figures (see FIGS. 4, 5 and 6 again), for each fixing element (1), the bearing element (6) is inserted in the positioning housing (54, 55) of the fixing element (1) and is slidably mounted on at least a respective pin (P1, P2) arranged axially to cross the positioning housing (54, 55) between the first front wall (51) and the second rear wall (52) of the main body (5) of the fixing element (1).

Once more according to the preferred but not exclusive embodiment illustrated in the figures, the main body (5) of each fixing element (1) is H-shaped in such a way as to define, between the first front wall (51) and the second rear wall (52) two positioning housings (54, 55), while the bearing element (6) is U-shaped with the two arms (61, 62) of the U shape being respectively positioned in the two positioning housings (54, 55) (in particular see FIGS. 4, 5 and 6 again).

In the illustrated preferred embodiment, the guide system (10) is realised in such a way as to comprise a pair (31, 32) of first sliding elements (31, 32) which are mounted rotatably about respective two vertical pins (Z1, Z2) borne superiorly on the bearing element (6) and arranged bilaterally, and equidistant, to the axial plane (M) of the main body (5) of the fixing element (1), and a pair (41, 42) of second sliding elements (41, 42) which are mounted rotatably about respective two vertical pins (Z3, Z4) borne inferiorly on the bearing element (6) and arranged bilaterally, and equidistant, to the axial plane (M) of the main body (5) of the fixing element (1).

The first contact wall (310, 320) of the at least a first sliding element (31, 32), for the contact with the first outer edge (12) of the first continuous upper guide channel (11), is preferably conformed in such a way as to have a curved profile, and in which the first contact wall (410, 420) of the at least a second sliding element (41, 42), for the contact with the second outer edge (23) of the second continuous lower guide channel (21), is conformed in such a way as to have a curved profile.

In this way, at least a point of contact between the at least a first sliding element and the outer edge of the first continuous upper guide channel is guaranteed, as well as a point of contact between the at least a second sliding element and the outer edge of the second continuous lower guide channel.

Figure 10:
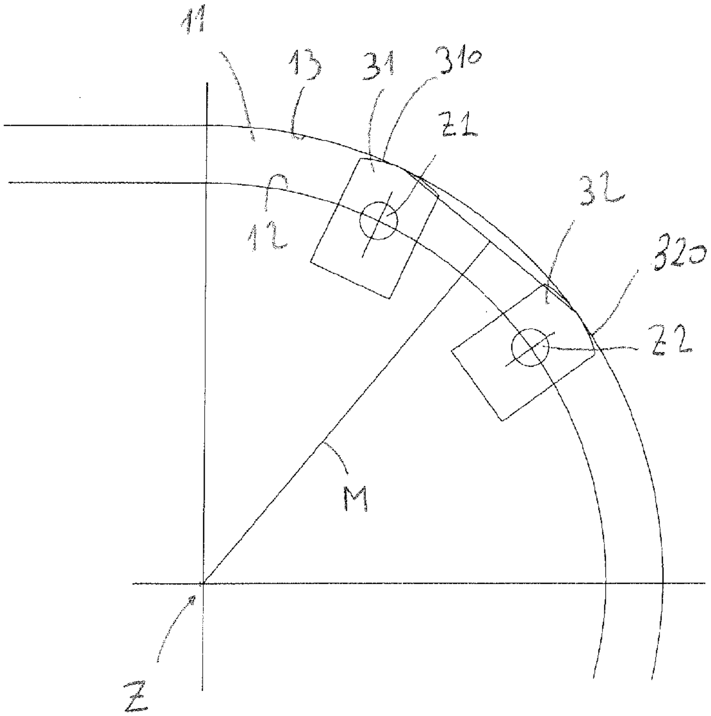
FIG. 10 illustrates, in a partial schematic view, some significant components of the transport system of the invention, extrapolate from the remaining other components, in a particular operating configuration.

For example, FIG. 10 schematically illustrates, schematically, the position assumed by a pair of first sliding elements (31, 32), mounted on a support element coupled to a respective fixing element, in relation to a curved portion of the first continuous upper guide channel (11), during the activation of the cogged belt.

The first sliding elements (31, 32), being able, with respect to the fixing element coupled to the cogged belt, to rotate about a vertical axis and translate along a translation direction perpendicular to the vertical axis, can continuously vary their orientation and position within the first continuous guide channel in such a way as always to have at least two respective points of contact between the respective outer walls (310, 320) and the outer edge (13) of the first continuous upper guide channel (11).

In this way, the axial axis (M) of the fixing element will always be radial to the vertical rotation axis of the pulleys, and further the chord defined between the points of contact of the two sliding elements will be perpendicular to the axial axis (M) of the fixing element.

In a further preferred aspect, the guide system (100) comprises at least a pair of straight abutment walls (71, 72) which are arranged internally of the cogged belt (D) and facing the straight branches (D1) of the cogged belt (D) destined to constitute a straight abutment guide for the second wall (52) of the fixing elements (1) during the movement thereof along a straight branch (D1) of the cogged belt (D).

In a further advantageous aspect, the first wall (51) of each fixing element (5) is conformed in such a way as to comprise at least a projection (510) having a suitable shape for being inserted in a space existing between contiguous teeth of the cogging of the cogged belt (D), and wherein the fixing holes (53) of each fixing element (1) are made at the at least a projection (510).

The transport system (100) further comprises a first upper covering element (81), mounted superiorly to the cogged belt (D) and conformed in such a way that in the relative lower face there is a groove in a closed loop defining the first continuous upper guide channel (11), as well as a second lower covering element (82), mounted inferiorly to the cogged belt (D) and conformed in such a way that in the relative upper face there is a groove in a closed loop defining the second continuous lower guide channel (21).

The invention claimed is:

1. A transport system for moving products in a closed looped transport path, comprising:

a cogged belt wound in a closed loop on driving pulleys which are arranged with a vertical rotation axis;

a series of support elements, configured to support respective products and which are coupled in a cantilever fashion to the cogged belt at through-holes made in the cogged belt;

a series of fixing elements, configured to be arranged internally with respect to the cogged belt at the through-holes, for fixing the support elements in a cantilever fashion to the cogged belt;

a guide system for the fixing elements;

characterised in that the guide system comprises:

a first continuous upper guide channel, conformed in such a way as to present a respective first outer edge and a respective first inner edge and which extends according to a closed loop path internally of the closed loop of the cogged belt and comprising straight portions, arranged at straight branches of the cogged belt, and curved portions, connected to the straight portions, at curvilinear branches of the cogged belt, a second continuous lower guide channel, conformed in such a way as to have a respective second outer edge and a respective second inner edge and which extends according to a closed loop path internally of the closed loop of the cogged belt and comprising straight portions, arranged at straight branches of the cogged belt, and curved portions, connected to the straight portions, at curvilinear branches of the cogged belt, and in that the guide system further comprises, for each fixing element:

at least a first sliding element arranged superiorly with respect to the fixing element and configured to be able to slide internally of the first continuous upper guide channel, between the first outer edge and the first inner edge, with the at least a first sliding element which is conformed in such a way as to comprise a respective first contact wall, for contact with the first outer edge of the first continuous upper guide channel, and a respective second contact wall, for contact with the first inner edge of the first continuous upper guide channel, wherein the at least a first sliding element is superiorly coupled to the fixing element in such a way as to be able to rotate with respect to the fixing element according to a vertical axis, parallel to the vertical rotation axis of the driving pulleys of the cogged belt, and to be able to translate axially with respect to the fixing element along a translation direction perpendicular to the vertical axis, so that, during the driving of the cogged belt, the at least a first sliding element can change the orientation and position thereof with respect to the fixing element as a consequence of the passage thereof from a straight portion to a curved portion, and vice versa, of the first continuous upper guide channel and thus adapt the orientation thereof within the first continuous upper guide channel in such a way that at least one from between the respective first contact wall and the respective second contact wall is always in contact respectively with the first outer edge or the first inner edge of the first continuous upper guide channel;

and at least a second sliding element arranged inferiorly with respect to the fixing element and configured to be able to slide internally of the second continuous lower guide channel, between the second outer edge and the second inner edge, with the at least a second sliding element being conformed in such a way as to comprise a respective first contact wall, for contact with the second outer edge of the second continuous lower guide channel, and a respective second contact wall, for contact with the second inner edge of the second continuous lower guide channel, wherein the at least a second sliding element is inferiorly coupled to the fixing element in such a way as to be able to rotate with respect to the fixing element according to a vertical axis, parallel to the vertical rotation axis of the driving pulleys of the cogged belt, and to be able to translate axially with respect to the fixing element along a translation direction perpendicular to the vertical axis, so that, during the driving of the cogged belt, the at least a second sliding element can change the orientation and position thereof with respect to the fixing element as a consequence of the passage thereof from a straight portion to a curved portion, and vice versa, of the second continuous lower guide channel and thus adapt the orientation thereof within the second continuous lower guide channel in such a way that at least one from between the respective first contact wall and the respective second contact wall is always in contact respectively with the second outer edge or the second inner edge of the second continuous lower guide channel;

thus stably maintaining the cantilevered position, and the orientation, of the support elements with respect to the cogged belt.

2. The transport system as claimed in claim 1, wherein each fixing element comprises a main body comprising a first front wall and a second rear wall, wherein the first front wall comprises respective fixing holes and is conformed in such a way as to be internally coupled to the cogging of the cogged belt in such a way that the respective fixing holes are positioned at the through-holes present in the cogged belt for fixing the support elements to the cogged belt by means of respective blocking members, and wherein the main body of each fixing element is conformed in such a way as to comprise, between the first front wall and the second rear wall, a positioning housing, and in that the guide system comprises, for each fixing element, a bearing element for the at least a first sliding element and for the at least a second sliding element, with the bearing element being conformed in such a way as to be inserted and coupled translatably within the positioning housing of the fixing element in order to be able to translate axially between the first front wall and the second front wall of the fixing element according to the translation direction, and wherein the at least a first sliding element is mounted superiorly of the bearing element rotatably about a respective vertical pin parallel to the vertical rotation axis of the pulleys and the at least a second sliding element is mounted inferiorly to the bearing element rotatably about a respective vertical pin parallel to the vertical rotation axis of the pulleys.

3. The transport system as claimed in claim 2, wherein, for each fixing element, the bearing element is inserted in the positioning housing of the fixing element and is slidably mounted on at least a respective pin arranged axially to cross the positioning housing between the first front wall and the second rear wall of the main body of the fixing element.

4. The transport system as claimed in claim 2, wherein the main body of each fixing element is H-shaped in such a way as to define, between the first front wall and the second rear wall, two positioning housings, and wherein the bearing element is U-shaped with the two arms of the U-shape being respectively positioned in the two positioning housings.

5. The transport system as claimed in claim 2, wherein, for each fixing element, the guide system comprises a pair of first sliding elements which are mounted rotatably about respective two vertical pins borne superiorly on the bearing element and arranged bilaterally, and equidistant, to the axial plane of the main body of the fixing element, and a pair of second sliding elements which are mounted rotatably about respective two vertical pins borne inferiorly on the bearing element and arranged bilaterally, and equidistant, to the axial plane of the main body of the fixing element.

6. The transport system as claimed in claim 1, wherein the first contact wall of the at least a first sliding element, for the contact with the first outer edge of the first continuous upper guide channel, is conformed in such a way as to have a curved profile, and wherein the first contact wall of the at least a second sliding element, for the contact with the second outer edge of the second continuous lower guide channel, is conformed in such a way as to have a curved profile.

7. The transport system as claimed in claim 1, wherein the guide system comprises at least a pair of straight abutment walls arranged internally of the cogged belt and facing the straight branches of the cogged belt and destined to constitute a straight abutment guide for the second wall of the fixing elements during movement thereof along a straight branch of the cogged belt.

8. The transport system as claimed in claim 2, wherein the first front wall of each fixing element is conformed in such a way as to comprise at least a projection having a suitable shape for being inserted in a space existing between contiguous teeth of the cogging of the cogged belt, and wherein the fixing holes of each fixing element are made at the at least a projection.

9. The transport system as claimed in claim 1, comprising a first upper covering element, mounted superiorly to the cogged belt and conformed in such a way that in the relative lower face there is a groove in a closed loop defining the first continuous upper guide channel, and comprising a second lower covering element, mounted inferiorly to the cogged belt and conformed in such a way that in the relative upper face there is a groove in a closed loop defining the second continuous lower guide channel.

* * * * *